US 8,985,666 B2

(12) United States Patent
Maruyama

(10) Patent No.: US 8,985,666 B2
(45) Date of Patent: Mar. 24, 2015

(54) STRUCTURE FOR VEHICLE SEAT

(75) Inventor: Katsuji Maruyama, Kanagawa (JP)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/812,822

(22) PCT Filed: Sep. 17, 2010

(86) PCT No.: PCT/JP2010/066233
§ 371 (c)(1),
(2), (4) Date: Apr. 11, 2013

(87) PCT Pub. No.: WO2012/014334
PCT Pub. Date: Feb. 2, 2012

(65) Prior Publication Data
US 2013/0214551 A1    Aug. 22, 2013

(30) Foreign Application Priority Data
Jul. 29, 2010   (JP) ................................. 2010-170358

(51) Int. Cl.
  *B60N 2/02*    (2006.01)
  *B60N 2/07*    (2006.01)
  *B60N 2/015*   (2006.01)
  (Continued)

(52) U.S. Cl.
  CPC .............. *B60N 2/0722* (2013.01); *B60N 2/015* (2013.01); *B60N 2/0715* (2013.01); *B60N 2/073* (2013.01); *B60R 22/18* (2013.01); *B60N 2/06* (2013.01); *B60N 2/065* (2013.01)
  USPC .................................... 296/65.13

(58) Field of Classification Search
  CPC .. B60N 2/0715; B60N 2/0705; B60N 2/0843; B60N 2/0818; B60N 2/0825; B60N 2/071
  USPC ........... 296/65.13, 65.14, 68.1; 248/429, 730, 248/393, 419; 297/341, 344.1; 280/804
  See application file for complete search history.

(56) References Cited

U.S. PATENT DOCUMENTS 4,565,344 A * 1/1986 Iwami ............................ 248/429
4,775,126 A * 10/1988 Yokoyama ..................... 248/430
(Continued)

FOREIGN PATENT DOCUMENTS

CN        1986277 A      6/2007
DE        42 01 354 A1   7/1992
(Continued)

OTHER PUBLICATIONS

European Search Report dated Jun. 25, 2014 issued in corresponding European Application No. 10855341.3.
(Continued)

*Primary Examiner* — Kiran B Patel
(74) *Attorney, Agent, or Firm* — Foley & Lardner LLP

(57) ABSTRACT

A seat structure for a vehicle includes: fixation members fixed to a floor at positions away from each other in a front-rear direction; a slide rail having an aluminum stationary rail held by the fixation members and a movable rail movable with respect to the stationary rail in the front rear direction; a seat cushion fixed to the movable rail; a seatback supported by the seat cushion; and an iron reinforcement plate fixed to the stationary rail at a position inside a safety-belt used area and outside regions having the fixation members.

3 Claims, 6 Drawing Sheets

(51) Int. Cl.
*B60R 22/18* (2006.01)
*B60N 2/06* (2006.01)

(56) References Cited

U.S. PATENT DOCUMENTS

| | | | | |
|---|---|---|---|---|
| 4,787,667 | A | * | 11/1988 | Nishino ................... 296/65.13 |
| 4,832,409 | A | * | 5/1989 | Borlinghaus et al. ......... 297/468 |
| 4,863,219 | A | * | 9/1989 | Ochiai ................... 297/452.11 |
| 5,137,244 | A | | 8/1992 | Negi |
| 5,192,045 | A | | 3/1993 | Yamada et al. |
| 5,370,350 | A | * | 12/1994 | Okano et al. ................. 248/430 |
| 5,575,449 | A | * | 11/1996 | Shinbori et al. .............. 248/429 |
| 5,620,161 | A | * | 4/1997 | Wisner et al. ............... 248/429 |
| 6,059,345 | A | * | 5/2000 | Yokota ....................... 296/65.14 |
| 6,422,526 | B1 | * | 7/2002 | Ishikawa et al. ............. 248/430 |
| 6,502,887 | B1 | * | 1/2003 | Lansinger ................. 296/65.13 |
| 7,770,863 | B2 | * | 8/2010 | Yamada et al. ............. 248/429 |
| 7,823,950 | B2 | * | 11/2010 | Toyota et al. ............. 296/65.01 |
| 8,038,197 | B2 | * | 10/2011 | Koga ......................... 296/65.18 |
| 8,038,217 | B2 | * | 10/2011 | Yamagishi et al. ........... 297/341 |
| 8,061,756 | B2 | * | 11/2011 | Kimata et al. ............. 296/65.17 |
| 8,256,822 | B2 | * | 9/2012 | Koga et al. ................. 296/65.15 |
| 8,348,326 | B2 | * | 1/2013 | Koga ......................... 296/65.15 |
| 8,398,141 | B2 | * | 3/2013 | Parker et al. ................... 296/64 |
| 8,496,219 | B2 | * | 7/2013 | Okada et al. ................. 248/429 |
| 2003/0001405 | A1 | | 1/2003 | Lansinger |
| 2008/0308703 | A1 | | 12/2008 | Schmale et al. |

FOREIGN PATENT DOCUMENTS

| | | |
|---|---|---|
| DE | 10 2005 047 452 A1 | 4/2007 |
| EP | 0421300 A2 | 4/1991 |
| JP | 03-053330 | 5/1991 |
| JP | 4201636 A | 7/1992 |
| JP | 2009-509832 A | 3/2009 |
| JP | 2010-120554 A | 6/2010 |

OTHER PUBLICATIONS

International search report received in connection with international application No. PCT/JP2010/066233; dtd Dec. 14, 2010.

Office Action dated Oct. 24, 2014 in corresponding Chinese Application No. 201080068323.4, 5 pages.

* cited by examiner

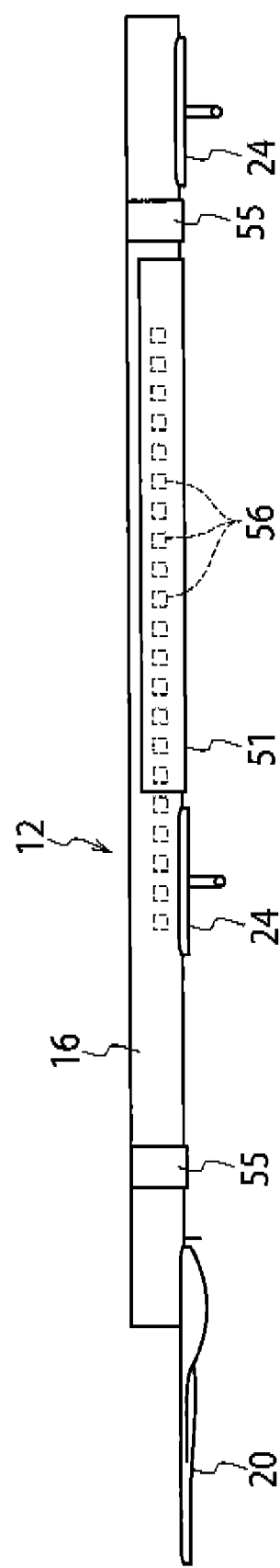

STRUCTURE FOR VEHICLE SEAT

CROSS REFERENCE TO RELATED APPLICATIONS

The present application is a National Stage of International Application No. PCT/JP2010/066233 filed on Sep. 17, 2010, which claims the benefit of Japanese Patent Application No. 2010-170358 filed on Jul. 29, 2010, the entire disclosures of which are incorporated herein by reference.

TECHNICAL FIELD

The present invention relates to a seat structure for a vehicle such as an automobile, a ship, an aircraft, or a rail vehicle, and particularly relates to a seat structure for a van.

BACKGROUND ART

In a conventional seat structure for a vehicle or especially for a van, a seat on which two passengers can sit side by side and a seat on which one passenger sits have a 6:4 relation in size. Each of these seats can slide in a front-rear direction by use of slide rails arranged side by side on a floor. Further, safety belts are arranged for the two-passenger seat and the one-passenger seat to allow a total of three passengers to be strapped. One base end of each safety belt is fixed to a frame of a vehicle body or of the seat. Mother base end of the safety belt is attached to the corresponding slide rail so as to be able to change in position in the front-rear direction along with the motion of the seat (see Patent Document 1). Thus, the safety belt can be fastened regardless of where the seat is positioned in the front-rear direction.

CITATION LIST

Patent Document

Patent Document 1: Japanese Patent Application Publication No. 2010-120554

SUMMARY OF INVENTION

However, the base ends of the two safety belts provided to the two-passenger seat are attached to a single slide rail of the two-passenger seat. For this reason, a large load is concentrated on the single slide rail. If a strengthening member is provided to the slide rail to obtain sufficient strength to withstand such a load, the weight of the slide rail drastically increases, which lowers the fuel economy of the automobile.

In consideration of such a problem, the present invention has an objective of providing a seat structure for vehicle having a slide rail increased in strength but light in weight.

In order to solve the above problem, a seat structure for vehicle according to an aspect of the present invention comprises: fixation members fixed to a floor at positions away from each other in a front-rear direction; a slide rail including an aluminum stationary rail held by the fixation members and a movable rail movable with respect to the stationary rail in the front-rear direction; a seat cushion fixed to the movable rail; a seatback supported by the seat cushion; and an iron reinforcement plate fixed to the stationary rail at a position inside a safety-belt used area and outside regions having the fixation members.

According to the present invention, the strength of the slide rail against a load applied to the safety belts can be increased. Further, since the reinforcement plate is fixed to the stationary rail at a position inside the safety belt used area and outside regions having the fixation members, the reinforcement plate can be reduced in size and weight.

BRIEF DESCRIPTION OF DRAWINGS

FIG. 8 is a side view for illustration, seen in arrow VIII in FIG. 2.

DESCRIPTION OF EMBODIMENT

Figure 1:
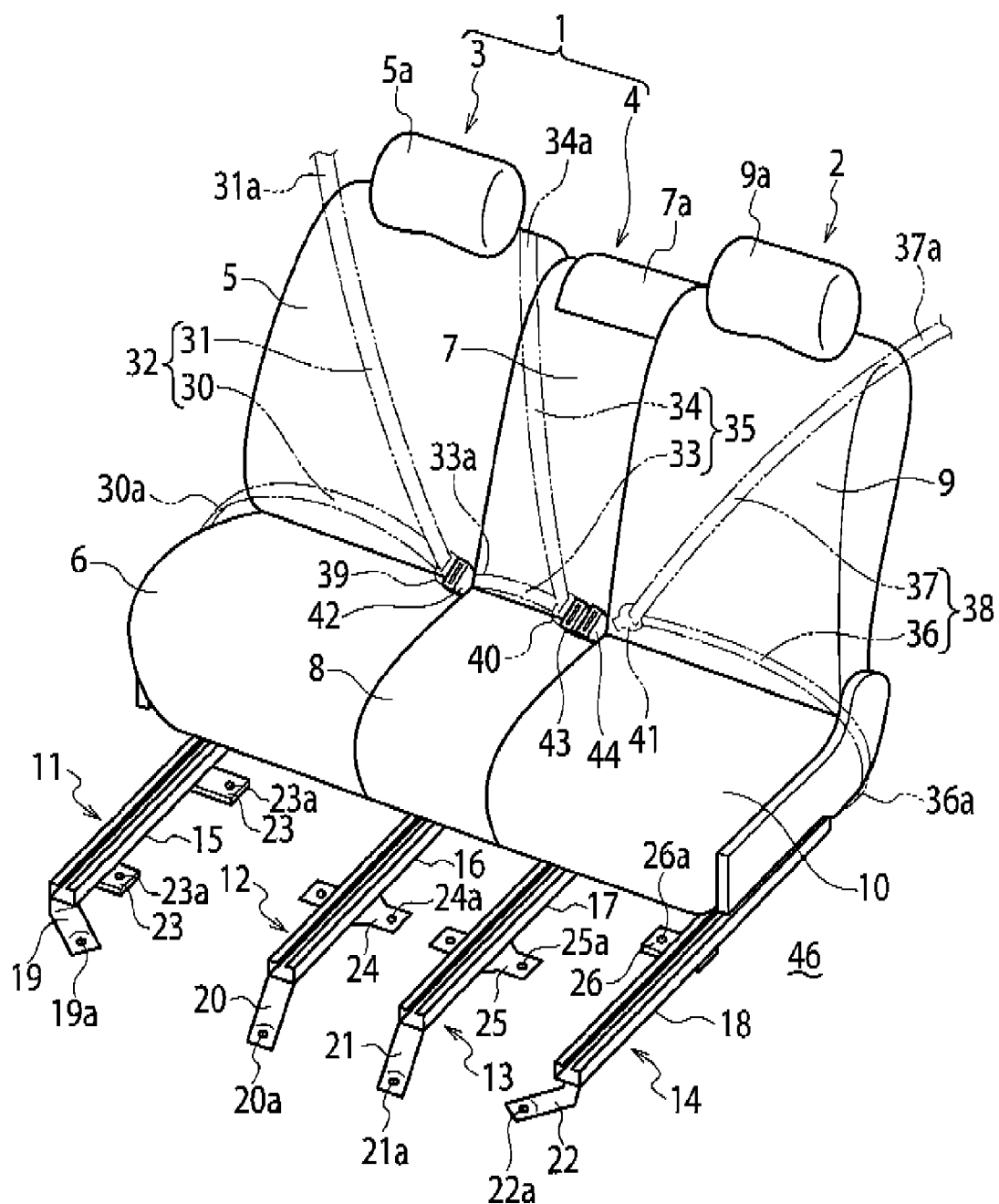
FIG. 1 is a perspective view showing vehicle seats according to an embodiment of the present invention.

With reference to the drawings, a detailed description is given below of a seat structure for vehicle according to an embodiment of the present invention. The embodiment of the present invention is described using an automobile as an example of the vehicle. Reference numeral 1 shown in FIG. 1 denotes a two-passenger seat on which two passengers can sit side by side. Reference numeral 2 denotes a one-passenger seat on which one passenger sits. The two-passenger seat 1 and the one-passenger seat 2 have a 6:4 relation in size in a width direction. The two-passenger seat 1 can slide in a front-rear direction by use of an outer slide rail 11 and an inner slide rail 12 which are arranged side by side on a floor 46 of the vehicle. Further, the one-passenger seat 2 can slide in the front-rear direction by use of an outer slide rail 13 and an inner slide rail 14 which are arranged side by side on the floor 46. The two-passenger seat 1 includes an outer seat 3 on the vehicle-body frame (not shown) side and an inner seat 4 on the vehicle center side.

The outer seat 3 of the two-passenger seat 1 includes a seatback 5 with a headrest 5a and a seat cushion 6. The inner seat 4 of the two-passenger seat 1 includes a seatback 7 with a headrest 7a and a seat cushion 8. The one-passenger seat 2 includes a seatback 9 with a headrest 9a and a seat cushion 10.

Safety belts 32, 35, 38 are arranged for the two-passenger seat 1 and the one-passenger seat 2 to allow a total of three passengers (not shown) to be strapped. The safety belt 32 includes a lap belt 30 and a shoulder belt 31. The safety belt 35 includes a lap belt 33 and a shoulder belt 34. The safety belt 38 includes a lap belt 36 and a shoulder belt 37.

One base end 31a of the safety belt 32 and one base end 37a of the safety belt 38 are fixed to the vehicle-body frame which is not shown. One base end 34a of the safety belt 35 is wound by a refractor which is provided to a frame (not shown) of the seatback 7.

Another base end 30a of the safety belt 32 is attached to to a movable rail (not shown) slidable with respect to a stationary rail 15 of the outer slide rail 11. The front-rear position of the base end 30a can be changed according to the front-rear motion of the outer seat 3. Thereby, the safety belt 32 can be fastened regardless of where the outer seat 3 of the two-passenger seat 1 is positioned in the front-rear direction.

Another base end 33a of the safety belt 35 is attached to a movable rail (not shown) slidable with respect to a stationary rail 16 of the inner slide rail 12. The front-rear position of the base end 33a can be changed according to the front-rear motion of the inner seat 4. Thereby, the safety belt 35 can be fastened regardless of where the inner seat 4 of the two-passenger seat 1 is positioned in the front-rear direction.

A movable tongue plate 39 provided to the safety belt 32 can be attached to or detached from a buckle 42 provided between the outer seat 3 and the inner seat 4. A movable tongue plate 40 provided to the safety belt 35 can be attached to or detached from a buckle 43 provided between the inner seat 4 and the one-passenger seat 2. A movable tongue plate 41 provided to the safety belt 38 can be attached to or detached from a buckle 44 provided between the inner seat 4 and the one-passenger seat 2.

Accordingly, the stationary rail 16 of the inner slide rail 12 receives a total of three loads: a load applied to the seatback 5 via the one base end 34a of the safety belt 35, a load applied thereto directly via the other base end 33a of the safety belt 35, and a load applied thereto via the buckle 42 in engagement with the tongue plate 39 of the safety belt 32.

Figure 2:
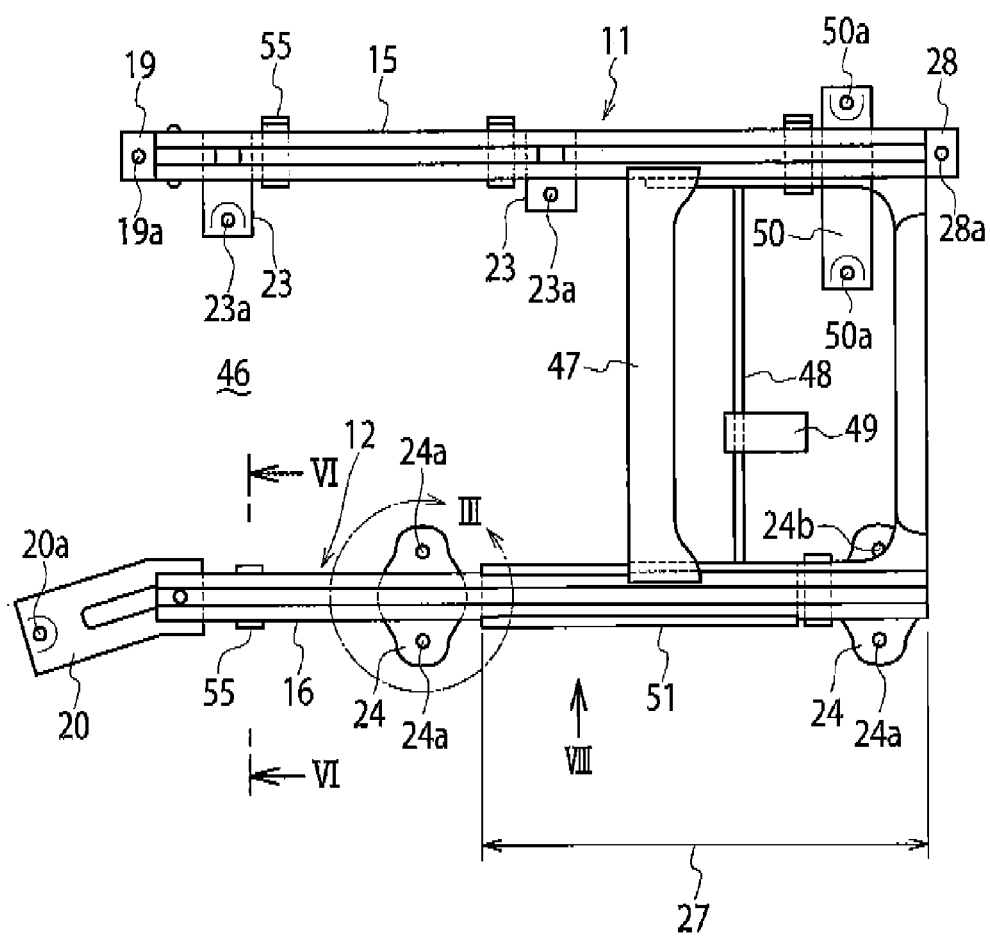
FIG. 2 is a top view showing only the slide rails of the vehicle seat in FIG. 1 on which two passengers can sit side by side.

As shown in FIG. 2, the outer slide rail 11 includes the stationary rail 15 and the movable rail (not shown) movable inside the stationary rail 15 in the front-rear direction. The stationary rail 15 is fixed to the floor 46 via a front first leg 19 protruding frontward from the stationary rail 15, first brackets 23 protruding sideways from the stationary rail 15, and a rear first leg 28 located at a rear end portion of the stationary rail 15. Bolt insertion holes 19a, 23a, and 28a are formed in the front first leg 19, each first bracket 23, and the rear first leg 28, respectively. The stationary rail 15 is fixed to the floor 46 by insertion of bolts (not shown) into the bolt insertion holes 19a, 23a, and 28a. A floor-fixation bracket 50 shown in FIG. 2 protrudes sideways from the stationary rail 15, as the first brackets 23 do. Reference numeral 50a denotes each bolt insertion hole formed in the floor-fixation bracket 50.

Figure 3:
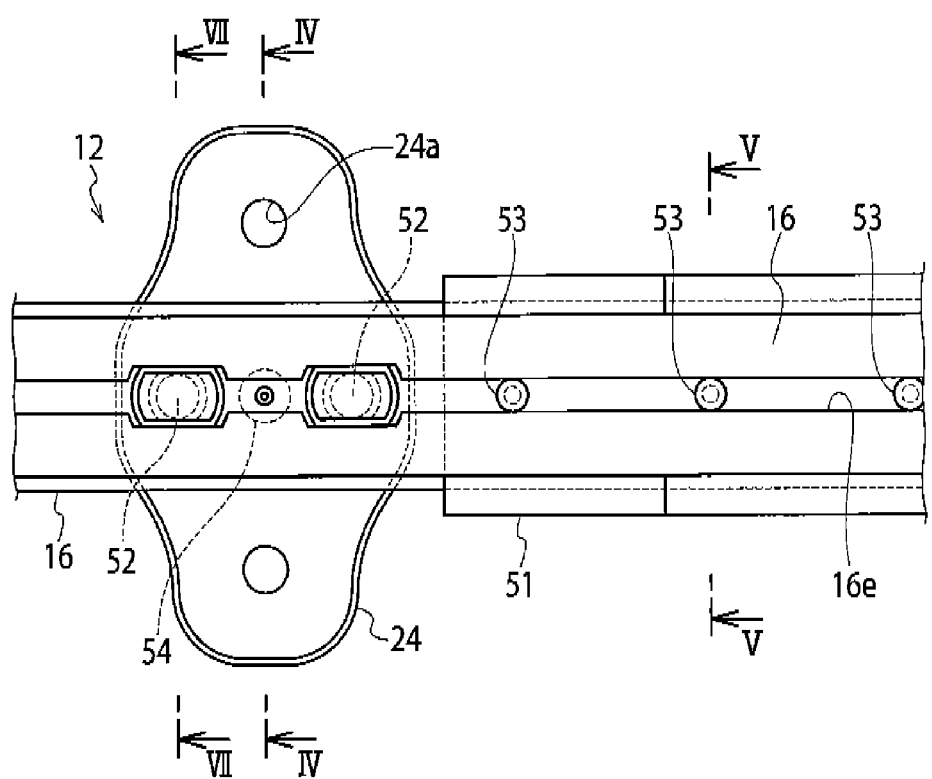
FIG. 3 is a top view showing portion III in FIG. 2 in an enlarged manner.
Figure 4:
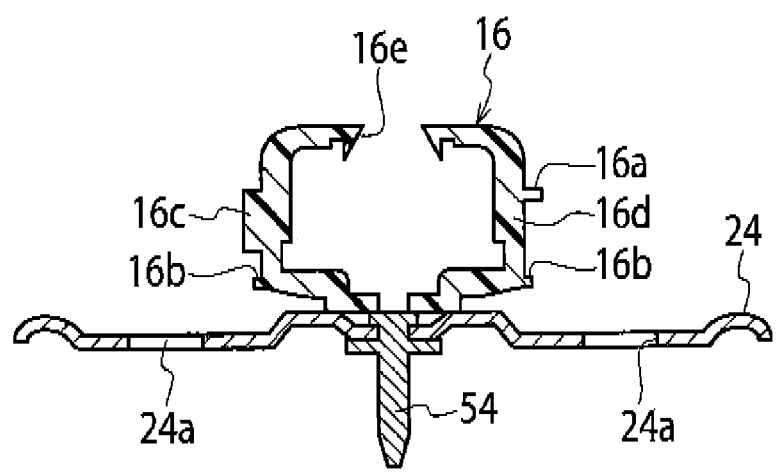
FIG. 4 is a sectional view of the slide rail, taken along line IV-IV in FIG. 3.
Figure 5:
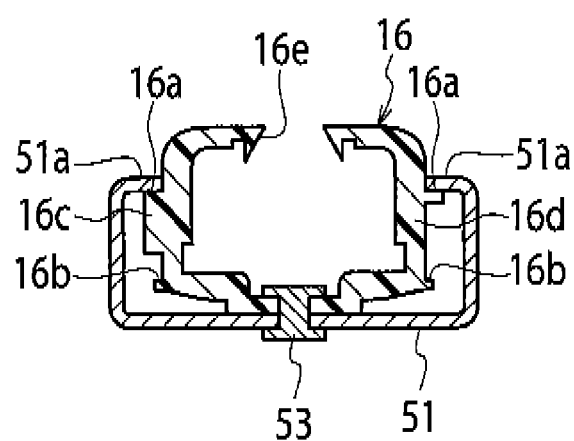
FIG. 5 is a sectional view of the slide rail, taken along line V-V in FIG. 3.
Figure 6:
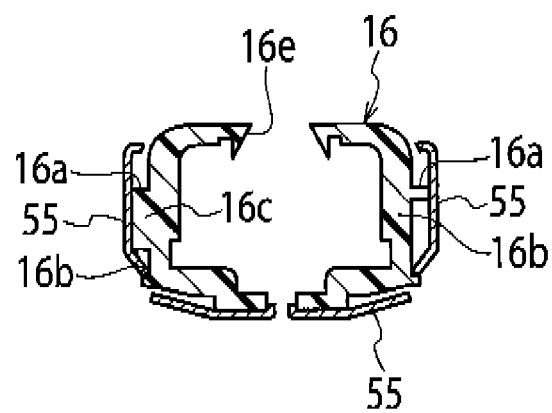
FIG. 6 is a sectional view of the slide rail, taken along line VI-VI in FIG. 2.
Figure 7:
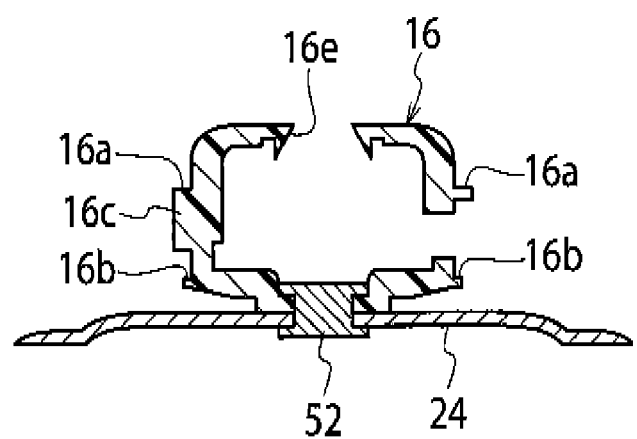
FIG. 7 is a sectional view of the slide rail, taken along line VII-VII in FIG. 3.

As shown in FIGS. 3 and 7, second brackets 24 which correspond to "fixation members" are placed under the stationary rail 16. Each second bracket 24 is fixed to the stationary rail 16 by first rivets 52. As shown in FIG. 2, an iron reinforcement plate 51 is placed between the second brackets 24, 24 of the stationary rail 16 which is made of aluminum. As shown in FIGS. 3 and 5, the reinforcement plate 51 is located under the stationary rail 16, and is fixed to the stationary rail 16 by use of second rivets 53. As shown in FIGS. 3 and 4, reference numeral 54 denotes a third rivet which also functions as positioning of the stationary rail 16 with respect to the floor 46. As shown in FIGS. 2, 6, and 8, reference numeral 55 denotes each rail cover bracket.

As shown in FIG. 2, the inner slide rail 12 includes the stationary rail 16 and the movable rail (not shown) movable inside the stationary rail 16 in the front-rear direction. The stationary rail 16 is fixed to the floor 46 via a front second leg 20 protruding obliquely frontward from the stationary rail 16, and the second brackets 24 protruding sideways from the stationary rail 16. Bolt insertion holes 20a and 24a are formed in the front second leg 20 and each second bracket 24, respectively. The stationary rail 16 is fixed to the floor 46 by insertion of bolts (not shown) into the bolt insertion holes 20a and 24a.

As shown in FIGS. 4 to 7, the stationary rail 16 includes a vertical-wall first sidewall portion 16c which is "one of sidewall portions," a vertical-wall second sidewall portion 16d which is "another one of the sidewall portions," engagement portions 16a, 16a protruding from the first sidewall portion 16c and the second sidewall portion 16d, engagement dented portions 16b, 16b dented in the first sidewall portion 16c and the second sidewall portion 16d, respectively, and a movable-rail sliding portion 16e in which the movable rail (not shown) can slide.

As shown in FIG. 5, the engagement portions 16a protrude to allow terminal portions 51a, 51a of the reinforcement plate 51 to engage the stationary rail 16. Further, the first sidewall portion 16c of the stationary rail 16 is, as shown in FIG. 8, provided with engagement openings 56 with which a latch (not shown) can engage, and the first sidewall portion 16c is thicker than the second sidewall portion 16d.

As shown in FIG. 2, a second leg frame 47 and a slide link 48 are laid across the stationary rail 15 and the stationary rail 16. Reference numeral 49 is a slide plate in which the slide link 48 can be operated. The outer slide rail 13 includes a stationary rail 17 and a movable rail (not shown) movable inside the stationary rail 17 in the front-rear direction. The stationary rail 17 is fixed to the floor 46 via a front third leg 21 protruding frontward from the stationary rail 17 and third brackets 25 protruding sideways from the stationary rail 17. Bolt insertion holes 21a and 25a are formed in the front third leg 21 and each third bracket 25, respectively. The stationary rail 17 is fixed to the floor 46 by insertion of bolts (not shown) into the bolt insertion holes 21a and 25a.

The inner slide rail 14 includes a stationary rail 18 and a movable rail (not shown) movable inside the stationary rail 18 in the front-rear direction. The stationary rail 18 is fixed to the floor 46 via a front fourth leg 22 protruding obliquely frontward from the stationary rail 18 and a fourth bracket 26 protruding sideways from the stationary rail 18. Bolt insertion holes 22a and 26a are formed in the front fourth leg 22 and the fourth bracket 26, respectively. The stationary rail 18 is fixed to the floor 46 by insertion of bolts (not shown) into the bolt insertion holes 22a and 26a.

According to the embodiment of the present invention described above, the following advantageous effects can be obtained.

The stationary rails 15, 16, 17, and 18—especially the stationary rail 16—are made of aluminum, and the iron reinforcement plate is fixed to the stationary rail 16 at a position inside of a safety-belt used area and outside regions having the second brackets 24 which correspond to the fixation members. Accordingly, the strength of the inner side rail 12, or especially the stationary rail 16, can be increased against a large load applied to the stationary rail 16 of the inner slide rail 12 via the safety belts 32, 35. The reinforcement plate 51 is provided only in an area which is inside the safety-belt used area 27 and outside regions having the second brackets 24 corresponding to the fixation members. Thereby, the reinforcement plate 51 can be small and light. Further, since the iron reinforcement plate 51 is fixed to the stationary rail 16 made of aluminum which is =weldable by use of the second rivets 53, the reinforcement plate 51 can reliably support the stationary rail 16.

Moreover, since the stationary rail 16 has the engagement portions 16a, 16a which allow the reinforcement plate 51 to engage with the stationary rail 16, the reinforcement plate 51 can be easily supported by the stationary rail 16.

Further, the engagement openings 56 with which the latch can engage are formed in the first sidewall portion 16c of the stationary rail 16, which is thicker than the second sidewall portion 16d. This allows drastic increase in the strength of the first sidewall portion 16c of the stationary rail 16 in which impacts or loads tend to concentrate.

In a state where the seatback 5 and/or the seatback 7 are folded forward so that no passenger can sit on the seat cushion 6 and/or the seat cushion 8 (walk-in state), belt anchor portions of the movable rails (not shown) (end portions of the safety belts on the movable rail side) are located on the front side (the left side in FIG. 2) of the safety-belt used area 27.

Although the embodiment of the present invention has been described as the seat structure for an automobile, the present invention is not limited to a seat structure for an automobile, and can be a seat structure for a vehicle such as a ship, an aircraft, or a rail vehicle.

This application claims the benefit of priority from Japanese Patent Application Publication No. 2010-170358 (filed on Jul. 29, 2010), the contents of which are incorporated herein by reference.

INDUSTRIAL APPLICABILITY

As described above, the seat structure for vehicle according to the embodiment of the present invention includes: the fixation members 24 fixed to a floor at positions away from each other in a front-rear direction; the slide rail 12 having the aluminum stationary rail 16 held by the fixation members 24 and the movable rail movable with respect to the stationary rail 16 in the front-rear direction; the seat cushion 6, 8 fixed to the movable rail; the seatback 5, 7 supported by the seat cushion 6, 8; and the iron reinforcement plate 51 fixed to the stationary rail 16 at a position inside the safety-belt used area 27 and outside regions having the fixation members 24. Such a configuration allows increase in the strength of the slide rail 12 against a load applied to the safety belts. In addition, being fixed to the stationary rail 16 at a position inside the safety-belt used area 27 and outside regions having the fixation members 24, the reinforcement rail 51 can be reduced in size and thus in weight. Therefore, the seat structure for vehicle according to the embodiment of the present invention is industrially applicable.

The invention claimed is:

1. A seat structure for a vehicle, comprising:
   fixation members fixed to a floor at positions away from each other in a front-rear direction;
   a slide rail including an aluminum stationary rail held by the fixation members and a movable rail movable with respect to the stationary rail in the front-rear direction,
   wherein the stationary rail has sidewalls extending vertically and extending in the front-rear direction;
   a seat cushion fixed to the movable rail;
   a seatback supported by the seat cushion;
   an iron reinforcement plate fixed to the stationary rail at a position inside a safety belt used area and outside regions having the fixation members;
   engagement portions protruding in a width direction from the sidewalls of the stationary rail;
   folded regions in the reinforcement plate that fold the reinforcement plate toward the sidewalls of the stationary rail in the width direction; and
   terminal portions of the reinforcement plate extending in the width direction from the folded regions of the reinforcement plate toward the sidewalls of the stationary rail,
   wherein the terminal portions of the reinforcement plate abut the engagement portions of the stationary rail to engage the reinforcement plate with the stationary rail and to fix the reinforcement plate to the stationary rail.

2. The seat structure for vehicle according to claim 1, wherein engagement openings with which a latch is engageable are formed in one of the sidewalls of the stationary rail, and the one of the sidewalls is thicker than an other of the sidewalls of the stationary rail.

3. The seat structure for vehicle according to claim 1, wherein the iron reinforcement plate reinforces the sidewalls.

* * * * *